Nov. 4, 1958     M. R. WADE     2,858,762
COFFEE MAKER

Filed April 29, 1957     2 Sheets-Sheet 1

INVENTOR.
M. Ross Wade
Maurice Ross Wade

Nov. 4, 1958    M. R. WADE    2,858,762
COFFEE MAKER

Filed April 29, 1957    2 Sheets-Sheet 2

INVENTOR.
M. Ross Wade
Maurice Ross Wade

United States Patent Office 2,858,762
Patented Nov. 4, 1958

2,858,762
COFFEE MAKER
Maurice Ross Wade, Fort Wayne, Ind.
Application April 29, 1957, Serial No. 655,591
4 Claims. (Cl. 99—287)

This invention relates to devices for making coffee, tea, or similar beverages, and more particularly has reference to a beverage brewing device having means for both heating the liquid confined therein, and for agitating said liquid by producing therein a rotary, swirling motion.

It is an object of the present invention to provide a beverage brewing unit which will brew a quantity of coffee, tea, or other beverage with markedly greater speed than has heretofore been true of devices conceived for the same or a similar purpose.

It is another object of the present invention to provide, in a device in which the brewing of the beverage is effected by rotary motion of an agitating means immersed in the liquid, a novel and vastly improved swirling, rotary motion or turbulence having a particular adaptability for drawing out the flavor from the coffee grounds, tea leaves, or other flavor-producing substance, and infusing said flavor smoothly and uniformly in the agitated liquid.

It is a further object of the present invention to incorporate in the rotary agitating means a basket-like container for the flavor-producing material, that is, the coffee grounds, tea leaves, or the like, with the rotary motion of said container being adapted for continuously cycling the water therethrough for the purpose of effecting a rapid infusion of the flavor into the liquid.

Yet another object is to so form the basket-like container as to define thereon scoop means both on the side and bottom of the container, resulting from striking portions of the material of the container outwardly, said scoop means being designed particularly to cause the water to be drawn into and circulated through the container responsive to the rotary motion thereof.

A further object is to further include in the rotary agitator vanes or impellers designed at the outlet side of the container in a manner to further aid in the cycling of water therethrough and direct the water, after it has passed through the container, outwardly and downwardly for re-cycling through the container.

For other objects and a better understanding of the invention, reference may be had to the following detailed description taken in connection with the accompanying drawing in which.

Figure 1:
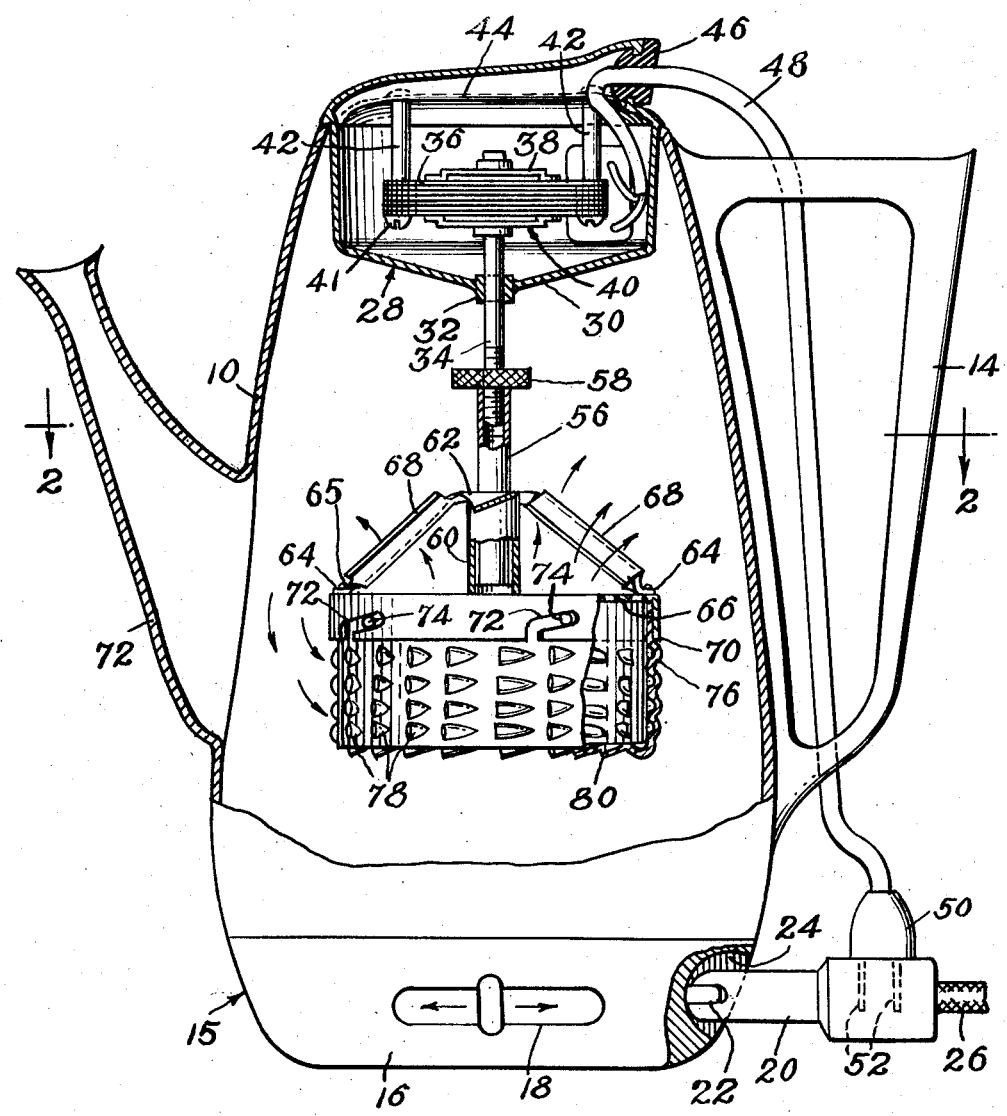
Figure 1 is a view of a coffee maker partly in side elevation and partly in longitudinal section, the rotary means being illustrated in its operative position.

Referring now more in detail to the drawing, designated at 10 is a container, which may be of any desired shape and in the illustrated example, but not necessarily, is elongated in a vertical direction, tapering gradually in the direction of its upper end. Provided upon the container 10 is a spout 12, diametrically opposite a handle 14. The container is adapted to seat upon a heating means in the form of an electrical heating unit generally designated 15, having a base 16 on which the container 10 rests. The heating unit 15 is adapted to contain a conventional resistance unit or element, not shown, and the extent of heat can be controlled through a manually adjustable thermostat or flavor control device 18. Terminals 22 of the heating unit are engageable by a plug 20, within a recess 24 of the base, and connected to the plug is a conventional appliance cord 26 extending from a source of electricity.

The heating unit 15 is of course per se conventional, and is of the type used in providing heat for electric coffee makers.

The container 10 is formed open at its upper end, and is closed during the brewing of the beverage by a combined lid and agitating assembly generally designated 28.

Assembly 28 includes a cupped casing 30 having a shallowly depressed bottom centrally formed with an opening in which is engaged a sleeve-type vapor seal 32 through which extends a shaft 34. Shaft 34 is extended axially of the container 10, downwardly from casing 30, and is the shaft of an electric motor 36 having the usual shaft bearings 38, 40. The motor 36 is supported by bolts and spacers 41, 42 respectively from a lid element 44 that seats upon the upper end of the container 10, in position to close the container. The casing 30 is fixedly secured to the periphery of the lid 44, and at one side, the lid is formed with an opening in which is engaged a grommet 46 of soft rubber or other electrical insulation material, through which extends a power supply cord 48 the leads of which are connected to the terminals of the motor, said cord extending exteriorly of the container and terminating in a plug 50 having prongs engaging in prong-receiving recesses 52 of the plug 20. It will be understood that an electrical connection is made, such that power is supplied through cord 26 not only for energizing the heating unit, but also for energizing the motor 36.

At its lower end, shaft 34 is threaded, to engage in the complementarily threaded upper end of a hollow shaft extension 56. A jam nut 58 is threaded on shaft 34, against extension 56 to hold the shaft 34 and the extension against relative axial displacement from selected positions to which they are relatively threadedly adjusted.

Figure 2:
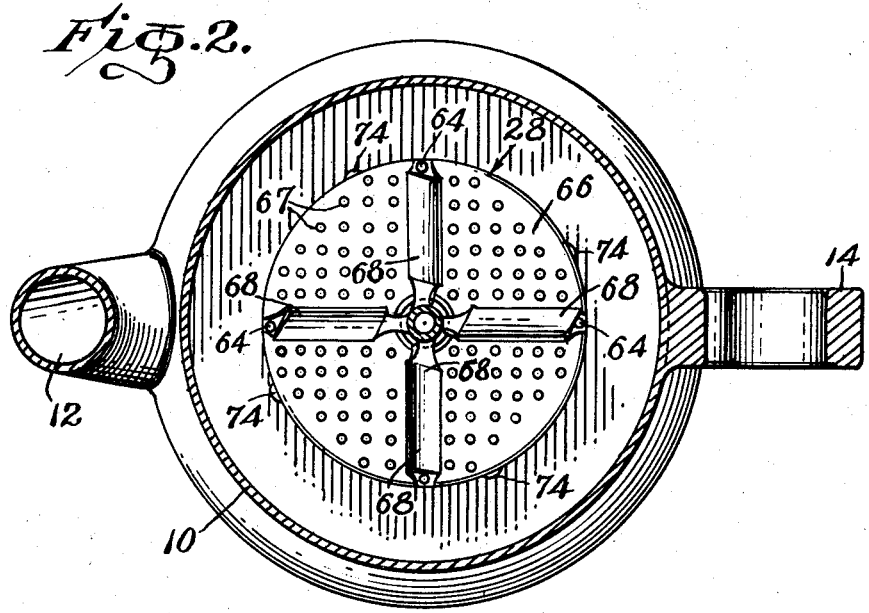
Fig. 2 is a transverse sectional view substantially on line 2—2 of Figure 1.

The lower end of extension 56 is received in and is fixedly engaged with a sleeve 60 integrally formed at its upper end with outwardly, downwardly projecting agitating blades angularly spaced 90° apart circumferentially of the sleeve as shown in Fig. 2. The blades include tongues 62 at their inner ends that are integral extensions of the upper end of the sleeve 60, said tongues merging into wider blade members 68 which in turn merge at their outer ends into tongues 64 connected by rivets 65 or equivalent means to the periphery of a basket cover 66 freely perforated over its entire area (see Fig. 2) as at 67.

The blade members 68 are transversely inclined or pitched, so that on rotation of the basket by the motor, the blade members 68 will draw water upwardly through the perforations 67 of the basket, and will direct said water radially outwardly of the basket for downward flow of the water adjacent the wall of container 10 to the area below the basket.

The agitator blades, in the illustrated embodiment, not only provide an inexpensive and yet fully effective means for directing the water along the path described above, but further serve as brace means for the connection of the basket to the shaft means 34, 56. In other words, the several blades extend radially outwardly from the shaft, to the periphery of the basket, and each blade has its length oblique to the length of the shaft means and oblique, also, to the plane of the top of the basket.

The basket cover 66 is integrally formed with a depending peripheral flange 70 formed at uniformly, angularly spaced locations with bayonet slots 72 adapted to receive outwardly struck lugs 74 formed upon the upper portion of the side wall of a cup shaped body portion 76 of the basket. The side wall of the basket is formed through its full length and circumference with relatively closely spaced openings, which openings result from striking outwardly small scoops 78 (see Figure 3). The striking of the scoops out of the material of the side wall of the basket produces in said side wall inlet openings 79, through which the water may enter the basket.

Figure 3:
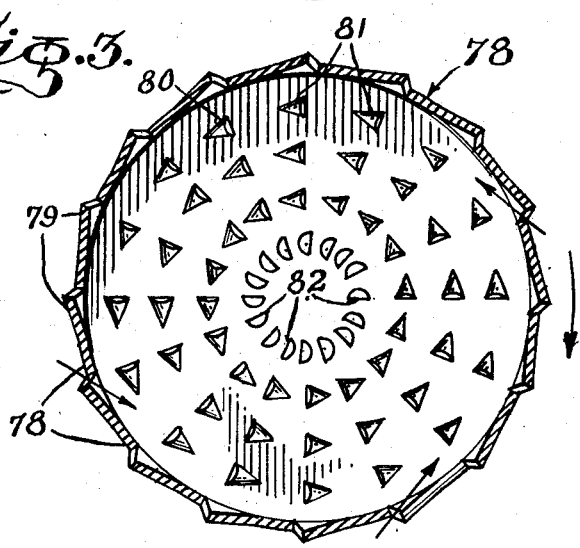
Fig. 3 is an enlarged horizontal sectional view through the basket.

In the bottom wall of the basket, scoops 80 are struck out of the material of the bottom wall, defining bottom inlet openings 81. Scoops 80 are arranged in radially extending rows uniformly angularly spaced about the axis of rotation of the basket as shown in Figure 3, said rows at their inner ends including closely spaced scoops 82.

All the scoops of the side wall and bottom wall open in the same direction, in the sense of rotation of the basket. Therefore, when the basket is rotated by the motor, water will be scooped up by the scoops 78, 80 and will be drawn into the basket. Previously, there will have been deposited in the basket a quantity of coffee, tea, or other flavor-producing material. Therefore, the cycling of the water through the basket in the manner described will cause said material within the basket to be freely agitated and maintained in a continuous state of suspension within the rapidly cycling water, as distinguished from prior arrangements in which the ground coffee tends to stick to the sides of the basket and clog the several perforations of the basket, preventing full extraction of the flavor and causing an extremely retarded brewing action.

The cycling of the water through the basket is further aided by the location and pitch of the agitator blades. These characteristics of the agitator blades cooperate with the form and location of the several scoops, that is, the scoops draw water upwardly and inwardly of the basket, while the agitator blades extract the water from the basket, causing the same to move upwardly through the perforations 67 to the top wall thereof, and then outwardly, downwardly for re-cycling.

The arrangement has the highly desirable characteristic, in that simultaneously with heating of the water, the water is rapidly circulated directly through the ground coffee, in a manner to keep the coffee fully agitated and in suspension within the water, with said circulation being repeated over and over again.

The result is that the beverage not only is given a particularly high degree of flavor in relation to a relatively small quantity of flavor-producing materials, but also, the entire brewing process is accelerated, to produce coffee or some other beverage with far greater rapidity than has been true of conventional electric coffee makers hereinbefore referred to. The particular shape and relative arrangement of the several component parts of the agitating means is believed to contribute in large degree to the desirable results obtained. Further, the results are thought to be obtained, further, from the general relationship of the combined lid and agitator means to the container and its associated heating device.

Still further, there is present in the invention the desirable characteristic wherein the used grounds can be readily removed, and replaced by fresh coffee, since the entire assembly 28 is bodily removable from the container, to provide access to the basket.

While various changes may be made in the detail construction, it shall be understood that such changes shall be within the spirit and scope of the present invention as defined by the appended claims.

What I claim as new and desire to protect by Letters Patent of the United States is:

1. A beverage brewing device comprising: a container open at one end, and agitating means removably supported within said open end of the container in condition to agitate the contents thereof, said agitating means including a motor having a shaft extending axially within the interior of said container, a perforated basket cover secured to and rotating with the shaft, a plurality of blades rigid with the shaft and cover and pitched to draw water upwardly through the perforations of the cover responsive to rotation of the cover, shaft, and blades in a common direction, and a perforated basket removably connected to and depending from the cover and adapted to hold a quantity of a flavor-producing material.

2. A beverage brewing device as in claim 1, the basket including outwardly projecting scoops at the sides and bottom thereof adjacent the several perforations of the basket, said scoops being pitched to direct water into the basket through the side and bottom perforations responsive to rotation of the basket in said direction.

3. A beverage brewing device as in claim 1, said blades extending obliquely both to the length of the shaft and to the plane of the basket cover, to brace the connection between the basket cover and shaft.

4. A beverage brewing device comprising, in combination, a container open at one end, a combined lid and agitating means closing said open end of said container and extending into the interior of said container, heating means disposed in supporting relationship with the container for simultaneously heating and agitating the contents within said container, said lid and agitating means including a lid member supported upon the end of the container, a casing depending from said lid member within the container, a motor mounted within the casing including a shaft extending below the casing within the container, and an agitator carried by and rotatable with said shaft, said agitator including a perforated basket adapted to hold a quantity of a flavor producing material through which the water is to be circulated, said basket including a plurality of scoops at its sides and bottom pitched to draw water into the basket through said material responsive to rotation of the basket in one direction, and a plurality of angularly spaced blades above the basket extending radially from the shaft and pitched to draw water upward from the basket for re-cycling within the container.

References Cited in the file of this patent

UNITED STATES PATENTS

| | | |
|---|---|---|
| 412,667 | Richards | Oct. 8, 1889 |
| 556,358 | Maxfield | Mar. 17, 1896 |
| 861,990 | Knowles | July 30, 1907 |
| 1,572,861 | Sarrey | Feb. 9, 1926 |
| 1,984,047 | Thieme | Dec. 11, 1934 |
| 2,012,981 | Wilsey | Sept. 3, 1935 |
| 2,146,108 | Conrad | Feb. 7, 1939 |
| 2,150,560 | Ozer | Mar. 14, 1939 |
| 2,631,522 | Joy | Mar. 17, 1953 |

FOREIGN PATENTS

| | | |
|---|---|---|
| 73,226 | Norway | Mar. 8, 1948 |